US007693072B2

(12) United States Patent
Chiang et al.

(10) Patent No.: US 7,693,072 B2
(45) Date of Patent: Apr. 6, 2010

(54) METHOD AND APPARATUS FOR CONFIGURING A NETWORK TOPOLOGY WITH ALTERNATIVE COMMUNICATION PATHS

(75) Inventors: Mung Chiang, Princeton, NJ (US); Canhui Ou, Danville, CA (US); Jin Wang, Union City, CA (US); Raghvendra Savoor, Walnut Creek, CA (US); Stephen Sposato, Lafayette, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 629 days.

(21) Appl. No.: 11/457,344

(22) Filed: Jul. 13, 2006

(65) Prior Publication Data

US 2008/0013453 A1    Jan. 17, 2008

(51) Int. Cl.
    *H04L 12/28* (2006.01)
(52) U.S. Cl. ........................... 370/238; 370/254
(58) Field of Classification Search ................. 370/229, 370/235, 238; 709/238, 239
    See application file for complete search history.

(56) References Cited

U.S. PATENT DOCUMENTS

| 5,970,412 | A * | 10/1999 | Maxemchuk | 455/447 |
| 2003/0117950 | A1 * | 6/2003 | Huang | 370/220 |
| 2004/0033786 | A1 | 2/2004 | Kirkpatrick | |
| 2005/0096086 | A1 * | 5/2005 | Singamsetty | 455/557 |
| 2005/0188108 | A1 * | 8/2005 | Carter et al. | 709/239 |
| 2006/0002368 | A1 * | 1/2006 | Budampati et al. | 370/351 |
| 2006/0062288 | A1 * | 3/2006 | Hester | 375/222 |
| 2007/0140138 | A1 * | 6/2007 | Goffin | 370/252 |

OTHER PUBLICATIONS

Ajit Agrawal et al., "When Trees Collide: An Approximation Algorithm for the Generalized Steiner Problem on Networks", Siam J. Comput., vol. 24, No. 3, pp. 440-456, Jun. 1995, Society for Industrial and Applied Mathematics.

* cited by examiner

*Primary Examiner*—William Trost, IV
*Assistant Examiner*—Siming Liu
(74) *Attorney, Agent, or Firm*—Ed Guntin; Akerman Senterfitt LLP

(57) ABSTRACT

A method and apparatus for configuring a network topology with alternative communication paths. An apparatus that incorporates teachings of the present disclosure may include, for example, a network management system (NMS) having a network identification element that identifies a tree topology of network elements in a communication system comprising a root node and a plurality of leaf nodes, a network configuration element that specifies a desired number of alternative communication paths between each of the plurality of leaf nodes and the root node, and a network restructuring element that determines a configuration of additional lateral and vertical communication paths superimposed on a portion of the plurality of leaf nodes that achieves a desired cost objective according to the desired number of alternative paths and associated cost attributes. Additional embodiments are disclosed.

16 Claims, 4 Drawing Sheets

400

METHOD AND APPARATUS FOR CONFIGURING A NETWORK TOPOLOGY WITH ALTERNATIVE COMMUNICATION PATHS

FIELD OF THE DISCLOSURE

The present disclosure relates generally to communication systems, and more specifically to a method and apparatus for configuring a network topology with alternative communication paths.

BACKGROUND

As communication networks continue to grow at a rapid pace, substantial network expansion is taking place to expand the bandwidth capacity supplied to residences and commercial enterprises. In the course of network construction or maintenance thereof it is common for inadvertent outages to occur due to an accidental break in one or more communication links.

These outages can be very costly to commercial enterprises and can be an annoyance to consumers. If outages are too frequent, businesses and consumers can choose to subscribe to services from competing service providers. Moreover, outages can be dangerous during emergency situations warranting rapid response.

A need therefore arises for a method and apparatus for configuring a network topology with alternative communication paths.

DETAILED DESCRIPTION

Figure 1:
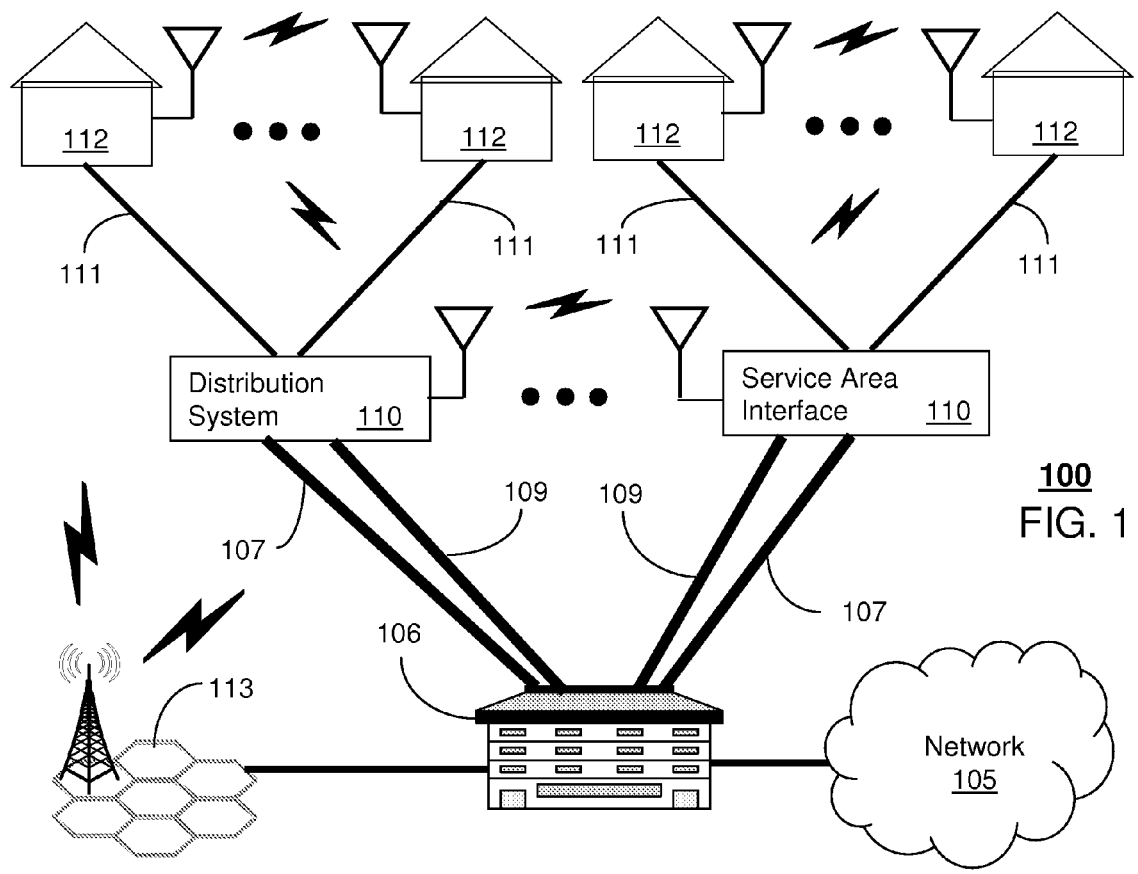
FIG. 1 depicts an exemplary block diagram of a communication system.

Embodiments in accordance with the present disclosure provide a method and apparatus for configuring a network topology with alternative communication paths.

In a first embodiment of the present disclosure, a computer-readable storage medium can have computer instructions for identifying a logical tree topology of network elements in a communication system, wherein the logical tree topology comprises a root node and a plurality of leaf nodes, identifying existing lateral and vertical communication paths between each of the plurality of leaf nodes, identifying a desired number of alternative paths between each of the plurality of leaf nodes and the root node, identifying cost attributes for adding at least one among lateral and vertical communication paths to each of the plurality of leaf nodes, and determining a configuration of additional lateral and vertical communication paths superimposed on a portion of the plurality of leaf nodes that achieves a desired cost objective according to the existing lateral and vertical communication paths, and the desired number of alternative paths and associated cost attributes.

In a second embodiment of the present disclosure, a computer-readable storage medium can have computer instructions for identifying a logical tree topology of network elements in a communication system, wherein the logical tree topology comprises a root node and a plurality of leaf nodes, identifying existing lateral and vertical communication paths between each of the plurality of leaf nodes, identifying a cost threshold for adding lateral and vertical communication paths to the plurality of leaf nodes, identifying cost attributes for adding at least one among lateral and vertical communication paths to each of the plurality of leaf nodes, and determining a configuration of additional lateral and vertical communication paths superimposed on a portion of the plurality of leaf nodes that achieves a desired reliability objective for increasing a number of alternative paths between each of the plurality of leaf nodes and the root node according to the existing lateral and vertical communication paths, and the identified cost threshold and cost attributes.

In a third embodiment of the present disclosure, a network management system (NMS) can have a network identification element that identifies a tree topology of network elements in a communication system comprising a root node and a plurality of leaf nodes, a network configuration element that specifies a desired number of alternative communication paths between each of the plurality of leaf nodes and the root node, and a network restructuring element that determines a configuration of additional lateral and vertical communication paths superimposed on a portion of the plurality of leaf nodes that achieves a desired cost objective according to the desired number of alternative paths and associated cost attributes.

In a fourth embodiment of the present disclosure, a network management system (NMS) can have a network identification element that identifies a tree topology of network elements in a communication system comprising a root node and a plurality of leaf nodes, a network configuration element that specifies a cost threshold for adding lateral and vertical communication paths to each of the plurality of leaf nodes, and a network restructuring element that determines a configuration of additional lateral and vertical communication paths superimposed on a portion of the plurality of leaf nodes that achieves a desired reliability objective for increasing a number of alternative paths between each of the plurality of leaf nodes and the root node according to the identified cost threshold and cost attributes associated with adding lateral and vertical communication paths to the plurality of leaf nodes.

In a fifth embodiment of the present disclosure, a method can have the steps of identifying a tree topology of network elements in a communication system, wherein the tree topology comprises a root node and a plurality of leaf nodes, and determining a configuration of lateral and vertical communication paths superimposed on a portion of the plurality of leaf nodes that achieves at least one among a desired cost objective according to a desired number of alternative paths and cost attributes associated with adding lateral and vertical communication paths to the plurality of leaf nodes, and a desired reliability objective for increasing a number of alternative paths between each of the plurality of leaf nodes and the root node according to a cost threshold for adding lateral and vertical communication paths to the plurality of leaf nodes, and the cost attributes.

FIG. 1 depicts an exemplary block diagram of a communication system 100. The communication system 100 comprises a central office (CO) 106 and a plurality of distribution systems 110 each coupled to a plurality of buildings 112. The CO 106 houses common network switching equipment for distributing local and long-distance telecommunication services supplied by network 105 to buildings 112 (such as dwellings or commercial enterprises) by way of the distribution systems 110. For illustration purposes only, buildings 112 will be referred to herein as residences 112. Telecommunication services of the CO 106 can include traditional POTS (Plain Old Telephone Service) and broadband services such as HDTV, DSL, VoIP (Voice over Internet Protocol), IPTV (Internet Protocol Television), Internet services, and so on.

Links 107 can be twisted copper pairs for distributing power to the distribution systems 110. Alternatively, links 107 can be coupled to commercial power located near the distribution systems 110 and supplied by a common utility company.

The distribution systems 110 can represent for example a service area interface (SAI), an optical network unit (ONU), or a routing terminal carrying IP traffic. For illustration purposes only, the distribution system 110 will be referred to herein as SAI 110. The SAI 110 can be coupled to optical and/or electrical cables 109 supplied by the CO 106, which carries any one or more of the aforementioned communications services. These services can be processed in part by active circuits in the SAI 106 and/or circuits at the residences 112. Each cable 109 carries communication lines numbering in the tens or hundreds. The SAI 110 serves to distribute portions of the cables 109 among the residences 112 as dedicated communication links 111. Thus, the SAI 110 can serve as a local cross-connect system for unbundling communication lines included in cable 109.

The residences 112 can have wireless communication capabilities. The wireless interface at the residences 112 can support short-range and/or long-range communications. Short-range communications can be supported by a WiFi access point located in the residence 112. Long-range communications can be supported by a wireless interface in the residence 112 that can access a remote wireless station 113 conforming to for example cellular (e.g., GSM, CDMA, UMTS, etc.) or WiMax technologies. The wireless station 113 can be coupled to the CO 106 directly or indirectly by way of network 105. The SAI 110 can support short-range and long-range wireless communications with similar technologies. The wireless interfaces provide a means for lateral or vertical communication paths between the residences 112, the SAIs 110 and the CO 106.

Lateral communication paths can include for example point-to-point communications between residences 112, and between the SAIs 110 utilizing short range wireless technologies such as WiFi. Vertical communication paths can include long range communications between a residence 112 and an SAI 110, a residence 112 and the wireless station 113, or an SAI 110 and the wireless station 106 utilizing WiMax or cellular technologies. Although the residences 112 and the SAIs 110 are illustrated as each having wireless capability, it is not required that such interfaces exist for all network nodes. Instead a number of residences 112 and/or SAIs 110 may only have wireline interfaces to other network nodes in the form of lateral or vertical communication paths.

Figure 2:
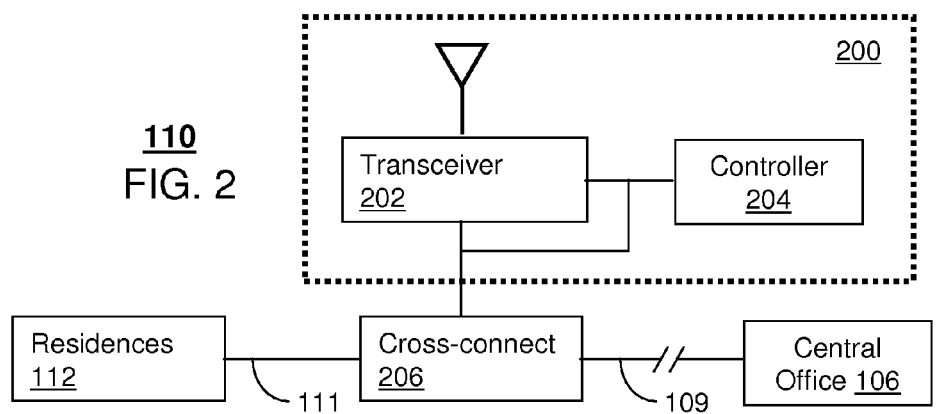
FIG. 2 depicts an exemplary block diagram of a distribution system operating in the communication system.

FIG. 2 depicts an exemplary embodiment in which an SAI 110 includes a wireless interface 200. The wireless interface 200 can have a wireless transceiver 202, and a controller 204 that manages operations of the wireless transceiver 202. The wireless transceiver 202 can be used for interfacing to the wireless station 113 when an interruption is detected in the communication services provided by the CO 106 to the residences 112. The interruption can be caused by any number of reasons including maintenance operation in the SAI 110, or an inadvertent break in a portion of the cable 109 due to for example field engineers performing cable maintenance, repairs, splicing, or additions.

The transceiver 202 and controller 204 interfaces to a cross-connect system 206 of the SAI 110. The cross-connect 206 can include a common multiplexer (not shown). Under the direction of the controller 204, the multiplexer can serve to multiplex links 111 from the residences 112 to one among the wireless transceiver 202 and the cables 109 of the CO 106 depending on the state of operations monitored by the controller 204. The controller 204 can utilize common computing technology such as a microprocessor, a digital signal processor (DSP), or a custom ASIC (Application Specific Integrated Circuit) state machine to manage operations of the SAI 110. The controller 204 can have internal or external storage media such as a RAM, SRAM, Flash, or other common storage element(s).

Figure 3:
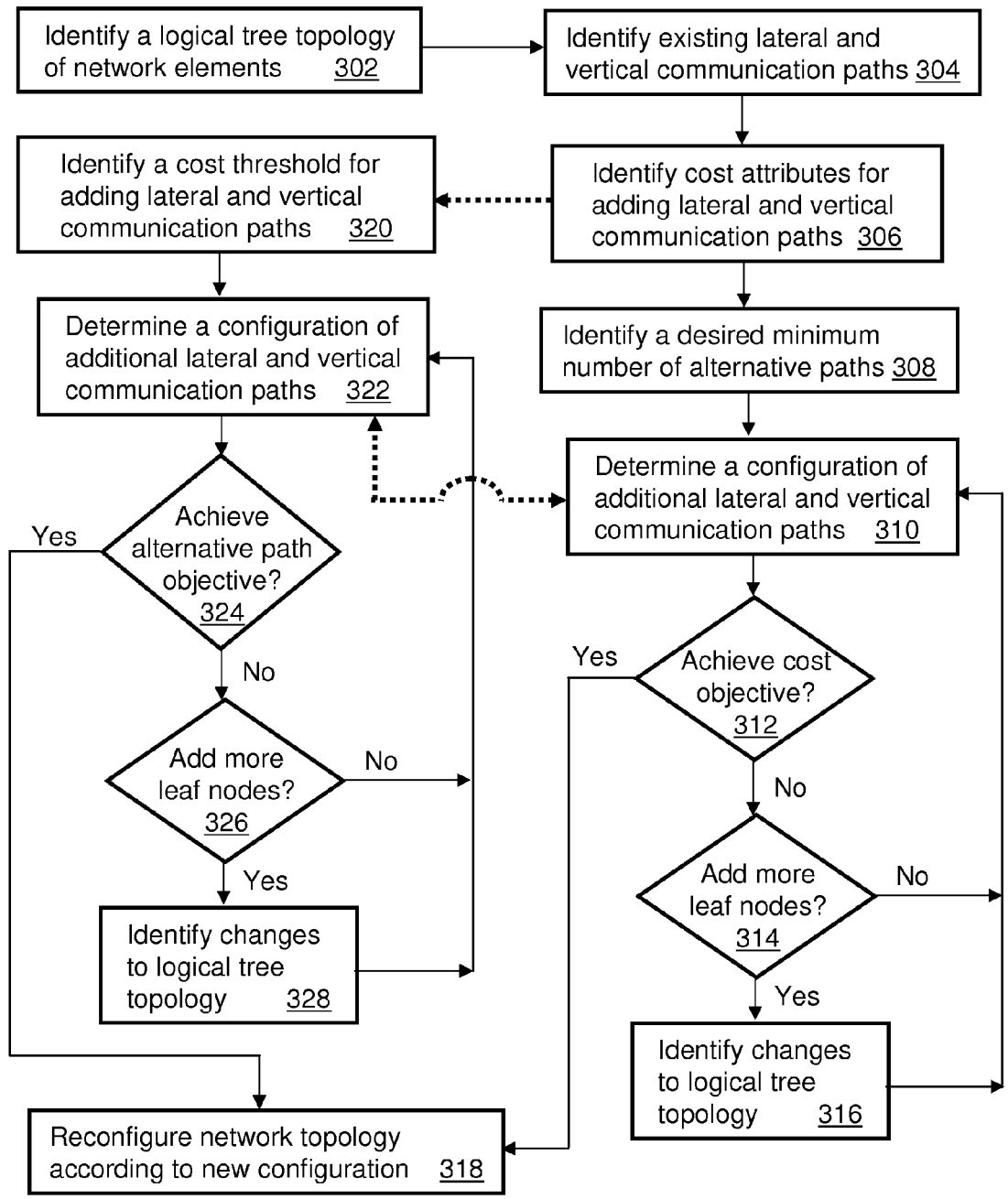
FIGS. 3-4 depict an exemplary method that can be applied to the communication system.
Figure 4:
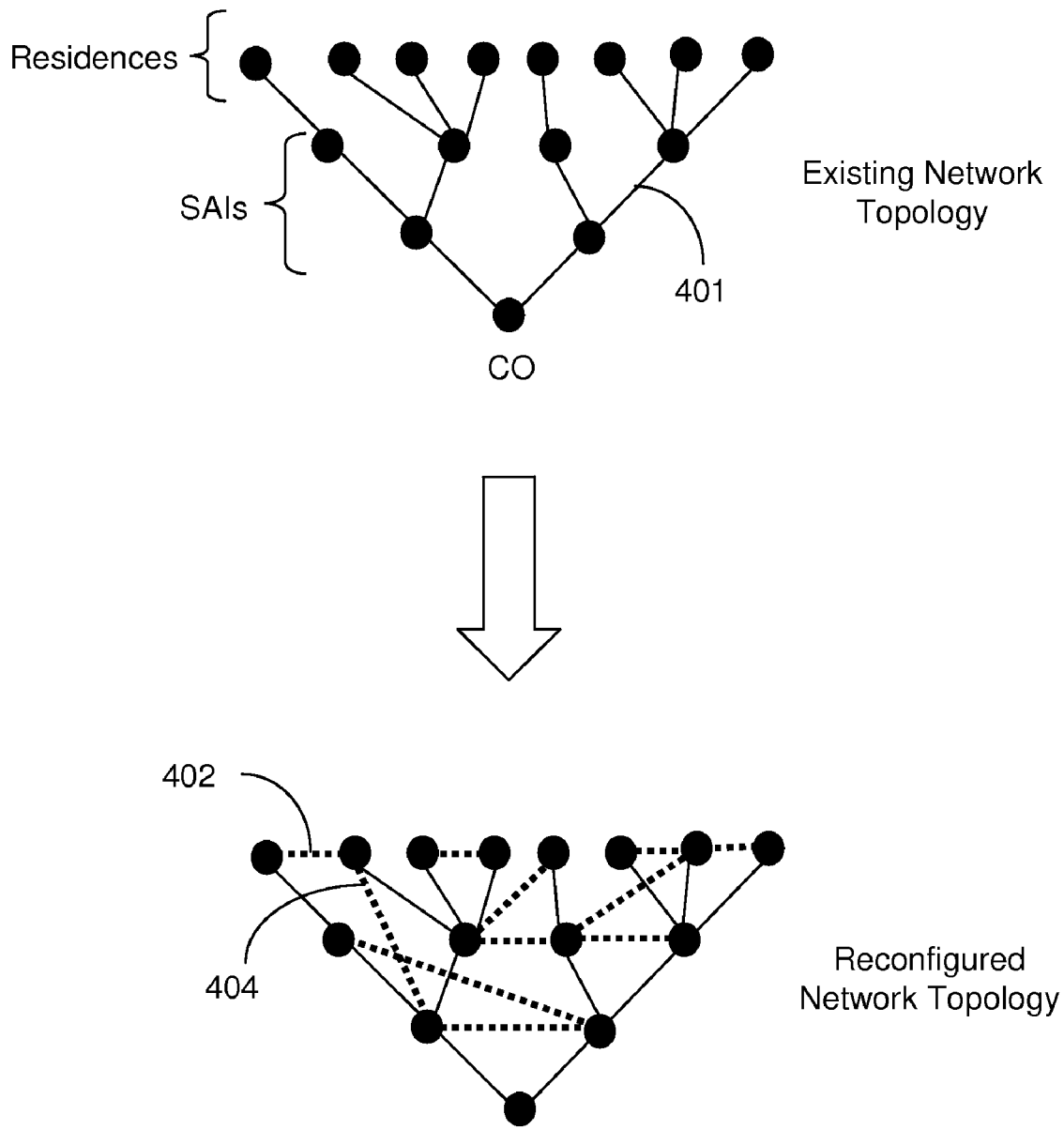

FIGS. 3-4 depict an exemplary method 300 that can be applied to the communication system 100. Method 300 can operate in a computing device such as a network management system (NMS) having a database that stores information relating to the network topology of the communication system 100. Under the direction of method 300, the NMS can be programmed to supply a configuration for updating the network topology of the communication system 100 for improving the communication system's reliability to deliver services to the residences 112.

With this in mind, method 300 begins with the step 302 in which the NMS identifies from its database a logical tree topology of network elements in the communication system 100 of FIG. 1. The logical tree topology can comprise a root node coupled to a plurality of leaf nodes. The root node can represent any network element of the communication system 100 having subordinate (or sibling) network elements. For instance, the root node can be represented by the CO 106 of FIG. 1, while the leaf nodes can be represented by the SAIs 110 and residences 112. FIG. 4 illustrates a logical tree topology having communication links 401 spanning from the residences 112 towards the CO 106 (or the root node). These links 401 are considered vertical communication paths, while communication links between residences 112 or SAIs 110 (none of which are present) are considered lateral communication paths.

Referring back to FIG. 3, in step 304 the NMS can be programmed to identify existing lateral and vertical communication paths in the tree topology. As noted above, in the illustration of FIG. 4 the existing tree topology has vertical communication paths between the leaf nodes and the root node, but no lateral communication paths exist between leaf nodes (i.e., between the residences 112 or between the SAIs 110). In step 306, the NMS identifies cost attributes for adding non-existing lateral and vertical communication paths. The cost attributes can be supplied by the service provider of the communication system 100. Cost attributes can include for example the cost of configuring WiFi access points at the residences 112 to establish lateral communication paths between residences, the cost of adding the wireless interface 200 to the SAIs 110, the cost of laying out additional cables (optical or copper) between the CO 106 and the SAIs 110 and the SAIs 110 and the residences 112, the cost of utilizing bandwidth in the wireless station 113 as a vertical communication path to the CO 106, and so on. The cost attributes can thus represent any incremental cost to the communication system 100 resulting from improvements in the reliability of communications between the leaf nodes and the root node from the addition of lateral or vertical communication paths.

In step 308 the NMS can be programmed to identify a desired minimum number of alternative paths between each of the leaf nodes and the root node. This metric can also be specified by the service provider as a measure of a desired reliability goal for the leaf nodes. The number of alternative paths for each leaf node may be uniform or vary between leaf nodes. Such variance can depend on service agreements with end users of the communication system 100 as well as regulatory considerations for supporting emergency response centers.

The NMS can be programmed in step 310 to determine a configuration of additional lateral and vertical communication paths superimposed on a portion of the leaf nodes that achieves a desired cost objective according to the existing lateral and vertical communication paths in the logical tree (step 304), the cost attributes for adding additional lateral and vertical communication paths to the leaf nodes (step 306), and the desired minimum number of alternative paths between the leaf nodes and the root node (step 308). A cost objective can be for example to solve for a configuration of additional lateral and vertical communication paths at the lowest cost possible that satisfies the desired minimum number of alternative paths between leaf nodes and the root node.

The process of improving reliability of the communication system 100 with an objective to minimize cost can be an iterative analysis. This formulation can be solved by for example algorithms that generalize a Steiner network problem. An exemplary algorithm that can be applied to step 310 is described in an article authored by Ajit Agrawal, Philip Klein, and R. Ravi, entitled "When Trees Collide: An Approximation Algorithm for the Generalized Steiner Problem on Networks," published by the Society for Industrial and Applied Mathematics (SIAM) Journal of Computation, vol. 24, no. 3, pp. 440-456, 1995, the contents of which are expressly incorporated herein by reference in its entirety.

With an algorithm such as described in this article, the NMS checks in step 312 whether the cost objective has been achieved. If the cost objective has not been achieved on a first iteration, the NMS can be programmed to proceed to step 314 to check whether leaf nodes have been added to the tree. This step takes into account situations in which the network topology of the communication system 100 is not static, but rather frequently reconfigured as a result of network expansions into new service areas.

If changes have not been made to the topology of the communication system 100, the NMS returns to step 310 and continues to analyze the network topology for a solution that improves its reliability at the lowest cost possible in accordance with the constraints given by steps 304-308. If changes are detected in step 314, the NMS identifies in step 316 the changes to the network topology and accounts for these changes as well as the constraints of steps 304-308 in the next iteration of step 310. This iterative process continues until a cost objective has been achieved. When such an event occurs, the NMS proceeds to step 318 where it submits a request to reconfigure the network topology of the communication system 100 according to the new configuration generated by the aforementioned steps. FIG. 4 provides an illustration of how the reliability of an existing network topology can be improved. In the reconfigured topology, the superimposed configuration adds lateral communication paths 402 and vertical communication paths 404 thereby increasing the overall number of alternative paths between the leaf nodes and the root node. The selection of the lateral and vertical communication paths in the reconfigured topology of FIG. 4 is a result of the aforementioned cost optimization analysis of step 310.

In an alternative embodiment, the reliability of the tree topology can be improved by solving for the largest possible number of alternative paths between the leaf nodes and the root node according to a given cost constraint. This embodiment is described by steps 320-328 of FIG. 3. In step 320, the NMS identifies a cost threshold for adding lateral and vertical paths to the tree topology. The cost threshold can define for example a spending limit for updating all or a portion of the communication system 100 with additional lateral or vertical communication paths. The cost threshold can limit spending for groups of leaf nodes or individual leaf nodes. The service provider can define a cost threshold to be applied uniformly across all leaf nodes, or by groups or individual leaf nodes.

Accordingly, in step 322 the NMS determines a configuration of additional lateral and vertical communication paths superimposed on a portion of the leaf nodes to achieve a desired reliability objective for increasing a number of alternative paths between the leaf nodes and the root node according to the parameters given in steps 302-206, and step 320. As before, an algorithm similar to the aforementioned article that generalizes the Steiner network problem can be utilized in step 322. The analysis for optimizing the reliability of the tree topology under the constraint of a cost threshold can be an iterative process which as described in the previous embodiment can take into account a network that is dynamically changing. This iterative process is described by steps 324-328. Once a solution is found, the NMS can proceed to step 318 as described earlier.

The foregoing embodiments of method 300 can also be combined. Each embodiment can analyze the network topology of the communication system 100 contemporaneously with shared results. That is, the algorithms can share their progressive results in an effort to determine optimal solutions for cost and reliability. The shared information can in turn speed the analysis as well as lead to a convergent solution for each of the respective algorithms.

It would be evident to an artisan with ordinary skill in the art that the foregoing embodiments can be modified, reduced, or enhanced without departing from the scope and spirit of the claims described below. For instance, as noted earlier the reliability improvements made to the communication system 100 do not need to be uniform. A service provider can therefore assign a high minimum number of alternative paths to a commercial enterprise paying a premium for a service level agreement (SLA), while residential end users can be assigned independently a minimum number of alternative paths commensurate with the service subscribed thereby. Accordingly, steps 308 and 320 can be varied for each leaf node without departing from the scope of the claims below.

This is but one example of many modifications that can be made to the present disclosure without deviating from the scope of the claims. The reader is therefore directed to the claims below for a fuller understanding of the breadth and scope of the present disclosure.

Figure 5:
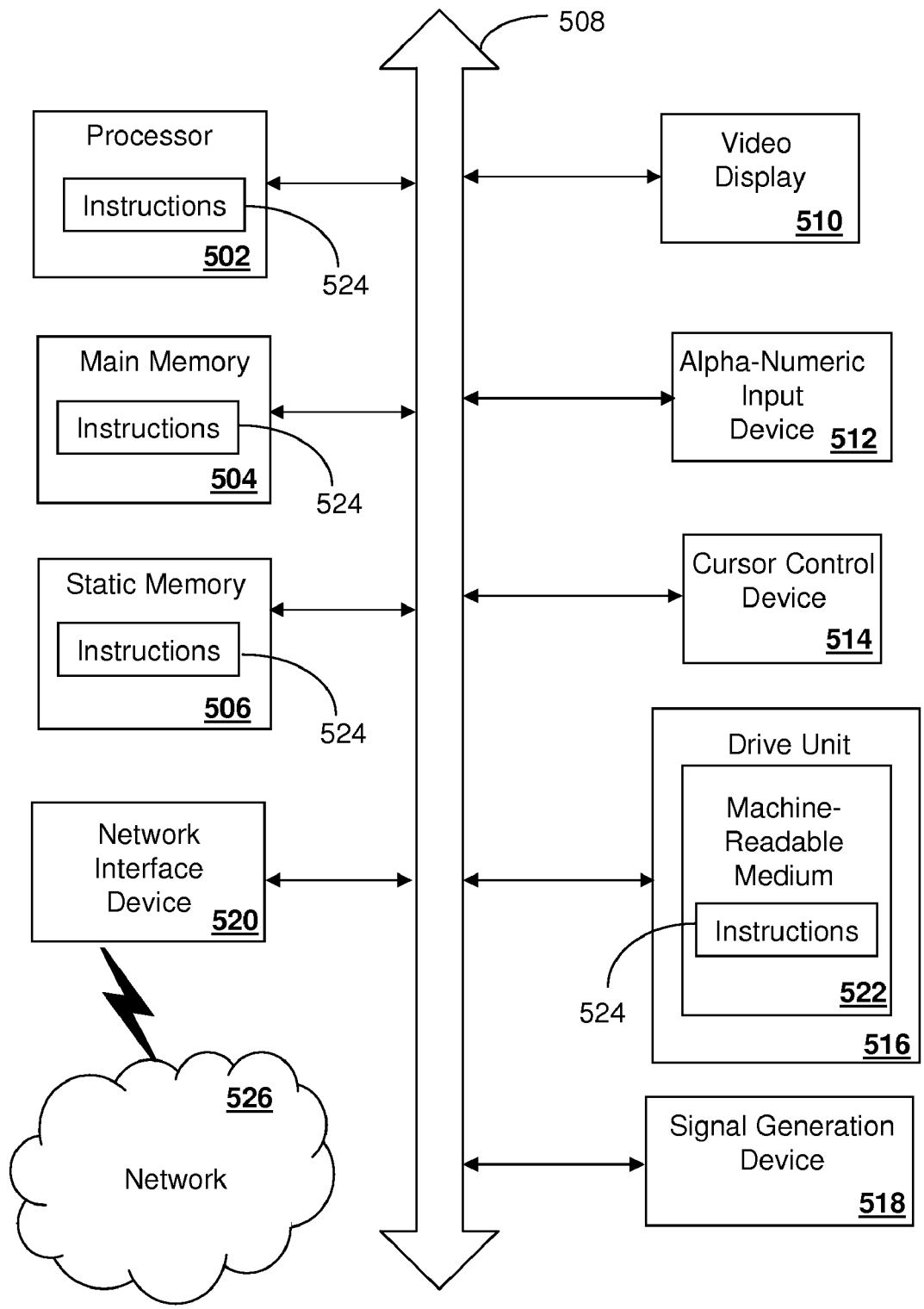
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure.

This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer-readable storage medium, comprising computer instructions to:
   identify a logical tree topology of network elements in a communication system for voice communications, wherein the logical tree topology comprises a root node and a plurality of leaf nodes;
   identify existing lateral and vertical communication paths between each of the plurality of leaf nodes;
   identify a desired number of alternative paths between each of the plurality of leaf nodes and the root node;
   identify cost attributes for adding at least one among lateral and vertical communication paths to each of the plurality of leaf nodes; and
   determine a configuration of additional lateral and vertical communication paths superimposed on a portion of the plurality of leaf nodes that achieves a desired cost objective according to the existing lateral and vertical communication paths, and the desired number of alternative paths and associated cost attributes,
   wherein the communication system supports data communications in the form of Internet Protocol Television communications, and wherein the root node comprises a central office, and wherein the plurality of leaf nodes comprises at least one among a corresponding plurality of gateways and distribution systems,
   wherein each gateway comprises a residential gateway, and wherein each distribution system comprises at least one among a service area interface (SAI), an optical network unit (ONU), and a routing terminal, and
   wherein the associated cost attributes are supplied by a service provider of the communication system and comprise two or more of a cost of configuring WiFi access points at a residence to establish lateral communication paths between residences, a cost of adding a wireless interface to the SAI, a cost of laying out additional cables between the central office and the SAI and the SAI and the residences, or a cost of utilizing bandwidth in a wireless station as a vertical communication path to the central office.

2. The storage medium of claim 1, comprising computer instructions to:
   add one or more leaf nodes to the logical tree topology; and
   determine the configuration that achieves the desired cost objective according to the additional one or more leaf nodes, the existing lateral and vertical communication paths, and the desired number of alternative paths and associated cost attributes.

3. The storage medium of claim 1, wherein the voice communications corresponds to Voice over Internet Protocol communications, and wherein lateral and vertical communication paths comprise one among wireless and wireline communication links.

4. The storage medium of claim 1, comprising computer instructions to submit a request to update the logical tree topology of network elements in the communication system according to the configuration.

5. A computer-readable storage medium, comprising computer instructions to:
   identify a logical tree topology of network elements in a communication system for voice communications, wherein the logical tree topology comprises a root node and a plurality of leaf nodes;
   identify existing lateral and vertical communication paths between each of the plurality of leaf nodes;
   identify a cost threshold for adding lateral and vertical communication paths to the plurality of leaf nodes;
   identify cost attributes for adding at least one among lateral and vertical communication paths to each of the plurality of leaf nodes; and
   determine a configuration of additional lateral and vertical communication paths superimposed on a portion of the plurality of leaf nodes that achieves a desired reliability objective for increasing a number of alternative paths between each of the plurality of leaf nodes and the root node according to the existing lateral and vertical communication paths, and the identified cost threshold and cost attributes,
   wherein the communication system supports data communications in the form of at least one of Internet Protocol Television communications and Internet Services, and wherein the root node comprises a central office, and wherein the plurality of leaf nodes comprises at least one among a corresponding plurality of gateways and distribution systems,
   wherein each gateway comprises a residential gateway, and wherein each distribution system comprises at least one among a service area interface (SAI), an optical network unit (ONU), and a routing terminal, and
   wherein the cost attributes are supplied by a service provider of the communication system and comprise two or more of a cost of configuring WiFi access points at a residence to establish lateral communication paths between residences, a cost of adding a wireless interface to the SAI, a cost of laying out additional cables between the central office and the SAI and the SAI and the residences, or a cost of utilizing bandwidth in a wireless station as a vertical communication path to the central office.

6. The storage medium of claim 5, comprising computer instructions to:
   add one or more leaf nodes to the logical tree topology; and
   determine the configuration that achieves the desired reliability objective for increasing the number of alternative paths between each of the plurality of leaf nodes and the root node according to the additional one or more leaf nodes, the existing lateral and vertical communication paths, and the identified cost threshold and cost attributes.

7. The storage medium of claim 5, wherein the voice communications corresponds to at least one of circuit switched voice communications and packet switched voice communications, and wherein lateral and vertical communication paths comprise one among wireless and wireline communication links.

8. The storage medium of claim 5, comprising computer instructions to submit a request to update the logical tree topology of network elements in the communication system according to the configuration.

9. A network management system (NMS), comprising:
   a network identification element that identifies a tree topology of network elements in a communication system for voice communications, the tree topology comprising a root node and a plurality of leaf nodes;

a network configuration element that specifies a desired number of alternative communication paths between each of the plurality of leaf nodes and the root node; and a network restructuring element that determines a configuration of additional lateral and vertical communication paths superimposed on a portion of the plurality of leaf nodes that achieves a desired cost objective according to the desired number of alternative paths and associated cost attributes, wherein the communication system supports data communications in the form of at least one of broadband communications, and wherein the root node comprises a central office, and wherein the plurality of leaf nodes comprises at least one among a residential gateway, a service area interface (SAI), an optical network unit (ONU), and a routing terminal, and wherein the associated cost attributes are supplied by a service provider of the communication system and comprise two or more of a cost of configuring WiFi access points at a residence to establish lateral communication paths between residences, a cost of adding a wireless interface to the SAI, a cost of laying out additional cables between the central office and the SAI and the SAI and the residences, or a cost of utilizing bandwidth in a wireless station as a vertical communication path to the central office.

10. The NMS of claim 9, comprising a network change element that adds one or more leaf nodes to the tree topology, wherein the network restructuring element determines the configuration that achieves the desired cost objective according to the additional one or more leaf nodes, and the desired number of alternative paths and associated cost attributes.

11. The NMS of claim 9, wherein the voice communications corresponds to at least one of circuit switched voice communications and packet switched voice communications, and wherein the NMS comprises a network request element that submits a request to update the tree topology of network elements in the communication system according to the configuration.

12. A network management system (NMS), comprising:
a network identification element that identifies a tree topology of network elements in a communication system for voice communications, the tree topology comprising a root node and a plurality of leaf nodes;

a network configuration element that specifies a cost threshold for adding lateral and vertical communication paths to each of the plurality of leaf nodes; and a network restructuring element that determines a configuration of additional lateral and vertical communication paths superimposed on a portion of the plurality of leaf nodes that achieves a desired reliability objective for increasing a number of alternative paths between each of the plurality of leaf nodes and the root node according to the identified cost threshold and cost attributes associated with adding lateral and vertical communication paths to the plurality of leaf nodes, wherein the communication system supports data communications in the form of at least one of Internet Protocol Television communications and Internet Services, and wherein the root node comprises a central office, and wherein the plurality of leaf nodes comprises at least one among a residential gateway, a service area interface (SAI), an optical network unit (ONU), and a routing terminal, and wherein the cost attributes are supplied by a service provider of the communication system and comprise two or more of a cost of configuring WiFi access points at a residence to establish lateral communication paths between residences, a cost of adding a wireless interface to the SAI, a cost of laying out additional cables between the central office and the SAI and the SAI and the residences, or a cost of utilizing bandwidth in a wireless station as a vertical communication path to the central office.

13. The NMS of claim 12, comprising a network change element that adds one or more leaf nodes to the tree topology, wherein the network restructuring element determines the configuration that achieves the desired reliability objective for increasing the number of alternative paths between each of the plurality of leaf nodes and the root node according to the additional one or more leaf nodes, and the identified cost threshold and cost attributes.

14. The NMS of claim 12, comprising a network request element that submits a request to update the tree topology of network elements in the communication system according to the configuration.

15. In a system, a method, comprising:
identifying a tree topology of network elements in a communication system for voice communications, wherein the tree topology comprises a root node and a plurality of leaf nodes; and determining a configuration of lateral and vertical communication paths superimposed on a portion of the plurality of leaf nodes that achieves at least one among a desired cost objective according to a desired number of alternative paths and cost attributes associated with adding lateral and vertical communication paths to the plurality of leaf nodes, and a desired reliability objective for increasing a number of alternative paths between each of the plurality of leaf nodes and the root node according to a cost threshold for adding lateral and vertical communication paths to the plurality of leaf nodes, and the cost attributes, wherein the communication system supports data communications in the form of at least one of Internet Protocol Television communications and Internet Services, and wherein the root node comprises a central office, and wherein the plurality of leaf nodes comprises at least one among a residential gateway, a service area interface (SAI), an optical network unit (ONU), and a routing terminal, and wherein the cost attributes are supplied by a service provider of the communication system and comprise two or more of a cost of configuring WiFi access points at a residence to establish lateral communication paths between residences, a cost of adding a wireless interface to the SAI, a cost of laying out additional cables between the central office and the SAI and the SAI and the residences, or a cost of utilizing bandwidth in a wireless station as a vertical communication path to the central office.

16. The method of claim 15, wherein the communication system supports data communications, and wherein the method comprises updating the tree topology of network elements in the communication system according to the configuration.

* * * * *